(12) United States Patent
Moore

(10) Patent No.: US 8,967,347 B2
(45) Date of Patent: Mar. 3, 2015

(54) ADJUSTMENT DEVICE FOR A HYDRAULIC BRAKE SYSTEM

(71) Applicant: Wayne-Ian Moore, Changhua County (TW)

(72) Inventor: Wayne-Ian Moore, Changhua County (TW)

(73) Assignee: Ashima Ltd., Changhua (TW)

( * ) Notice: Subject to any disclaimer, the term of this patent is extended or adjusted under 35 U.S.C. 154(b) by 115 days.

(21) Appl. No.: 13/873,247

(22) Filed: Apr. 30, 2013

(65) Prior Publication Data

US 2013/0233659 A1  Sep. 12, 2013

Related U.S. Application Data

(63) Continuation-in-part of application No. 13/218,463, filed on Aug. 26, 2011, now abandoned.

(51) Int. Cl.
| | |
|---|---|
| *B62L 3/02* | (2006.01) |
| *B60T 11/10* | (2006.01) |
| *B60T 7/10* | (2006.01) |
| *B60T 11/18* | (2006.01) |
| *B62K 23/06* | (2006.01) |

(52) U.S. Cl.
CPC .............. *B62L 3/023* (2013.01); *B60T 11/101* (2013.01); *B60T 7/108* (2013.01); *B60T 11/18* (2013.01); *B62K 23/06* (2013.01)
USPC ....................................... 188/344; 188/196 A

(58) Field of Classification Search
CPC ................................. B60T 7/108; B62I 3/023
USPC ........ 188/24.12, 24.22, 344, 351, 152, 151 R, 188/196 S, 196 M, 196 R; 74/502.2, 523, 74/525, 501.5 H, 500.5; 60/533, 568, 60/584–586, 413
See application file for complete search history.

(56) References Cited

U.S. PATENT DOCUMENTS

| | | | | |
|---|---|---|---|---|
| 6,688,440 | B2 * | 2/2004 | Matsushita et al. | 188/344 |
| 7,546,909 | B2 * | 6/2009 | Campbell et al. | 188/24.22 |
| 7,617,913 | B2 * | 11/2009 | Lumpkin | 188/24.22 |
| 2012/0096850 | A1 * | 4/2012 | Dunlap et al. | 60/585 |
| 2012/0145497 | A1 * | 6/2012 | Wang | 188/344 |

\* cited by examiner

*Primary Examiner* — Anna Momper

(57) ABSTRACT

An adjustment device for a hydraulic brake system includes a hollow casing and a retractable unit. The hollow casing has a rotatable ring to control the retractable unit. One end of the hollow casing is connected to a hydraulic hose, and another end is connected to a hydraulic cylinder. The adjustment device is assembled between a hydraulic hose and a hydraulic cylinder. When a user rotates the rotatable ring, the retractable unit is adjusted so as to control a sensitivity of a hydraulic brake system.

7 Claims, 5 Drawing Sheets

ADJUSTMENT DEVICE FOR A HYDRAULIC BRAKE SYSTEM

CROSS REFERENCE TO RELATED APPLICATIONS

This application is a continuation-in-part of U.S. patent application Ser. No. 13/218,463, filed Aug. 26, 2011.

BACKGROUND OF THE INVENTION

1. Field of the Invention

The present invention relates to an adjustment device, and more particularly to an adjustment device for a hydraulic brake system.

2. Description of Related Art

In order to make a brake system to work efficiently, most of the conventional brake systems are operated by the hydraulic force. The hydraulic brake system comprises a hydraulic hose, a brake lever unit and a brake disk system. One end of the hydraulic hose is connected to the brake lever unit and another end is connected to the brake disk system. Thus, when a user presses the brake lever, a piston is moved by the brake lever. The moving piston exerts a pressure on the hydraulic oil in the hydraulic hose so that the pressure activates the brake disk system for slowing down the vehicles. However, the whole brake system (said the brake lever unit, the hydraulic hose and the brake disk system) is an isolated system and the hydraulic oil is only flowing within this isolated system. Therefore, when the user presses the brake lever unit, the hydraulic oil generates a hydraulic pressure to drive the brake disk system for slowing down a vehicle. The magnitude of this hydraulic pressure is completely dominated by how much force the user presses the brake lever unit. Therefore, if this hydraulic pressure would be further adjusted, the user would easily brake the vehicle and the performance of the brake system would be more efficient.

The present invention has arisen to mitigate and/or obviate the disadvantages of the conventional hydraulic brake system.

SUMMARY OF THE INVENTION

The main objective of the present invention is to provide an improved adjustment device for a hydraulic brake system.

To achieve the objective, an adjustment device for a hydraulic brake system comprises a hollow casing having a first part, a second part and a connection member connected between the first part and the second part, the connection member having a rotatable ring pivotally disposed at a central portion thereof, the first part and the second part having a first channel and a second channel opened therethrough respectively, the connection member having a third channel opened therethrough, both the first channel and the second channel communicating with the third channel of the connection member, a retractable unit assembled in the hollow casing, the retractable unit having an inner tube and an outer tube, the inner tube and the outer tube having a fourth channel and a fifth channel opened therethrough respectively, the fourth channel and the fifth channel communicating with the first channel and the second channel, one end of the outer tube inserted into the first part, another end of the outer tube threadedly assembled with the rotatable ring, one end of the inner tube inserted into the fifth channel, another end of the inner tube fixed in the second part, the outer tube being movable relative to the inner tube by rotating the rotatable ring. Wherein, the first part has a nozzle defined at one end thereof which is opposite to the connection member, the second part having a connection head defined at one end thereof which is opposite to the connection member, a hydraulic hose and a hydraulic cylinder connected to the nozzle and the connection head respectively. The outer tube has a piston head defined at one end thereof, another end of the outer tube having an adjustment thread defined at an outer periphery thereof, the piston head received in the first channel, the rotatable ring having a driving thread defined in an inner periphery thereof and corresponding to the adjustment thread, the driving thread threadedly connected with the adjustment thread, so that the outer tube is moved relative to the inner tube by rotating the rotatable ring. The first part has a first abutting ring protruded from an outer periphery thereof, the connection member assembled to the first part and abutted against the first abutting ring, the second part having a second abutting ring protruded from an outer periphery thereof, the connection member assembled to the second part and abutted against the second abutting ring, the inner tube having a third abutting ring defined at an outer periphery thereof, one end of the third abutting ring abutted against an inner wall of the second part, another end of the third abutting ring abutted against one end of the outer tube. The connection member has a first connection portion and a second connection portion, the rotatable ring pivotally mounted between the first connection portion and the second connection portion, so that the rotatable ring is rotatable relative to the first connection portion and the second connection portion. The connection member has at least one extending portion extended from one end of the first connection portion toward the second connection portion and connected with an outer periphery of the second connection portion. The rotatable ring has a skidproof structure defined at an outer periphery thereof, so that the user can easily rotate the rotatable ring.

Under this arrangement, when a user rotates the rotatable ring, the outer tube is slid in the first channel, so that an inner space of the first part is adjustable and the hydraulic pressure is changed immediately.

Further benefits and advantages of the present invention will become apparent after a careful reading of the detailed description with appropriate reference to the accompanying drawings.

DETAILED DESCRIPTION OF THE INVENTION

Figure 1:
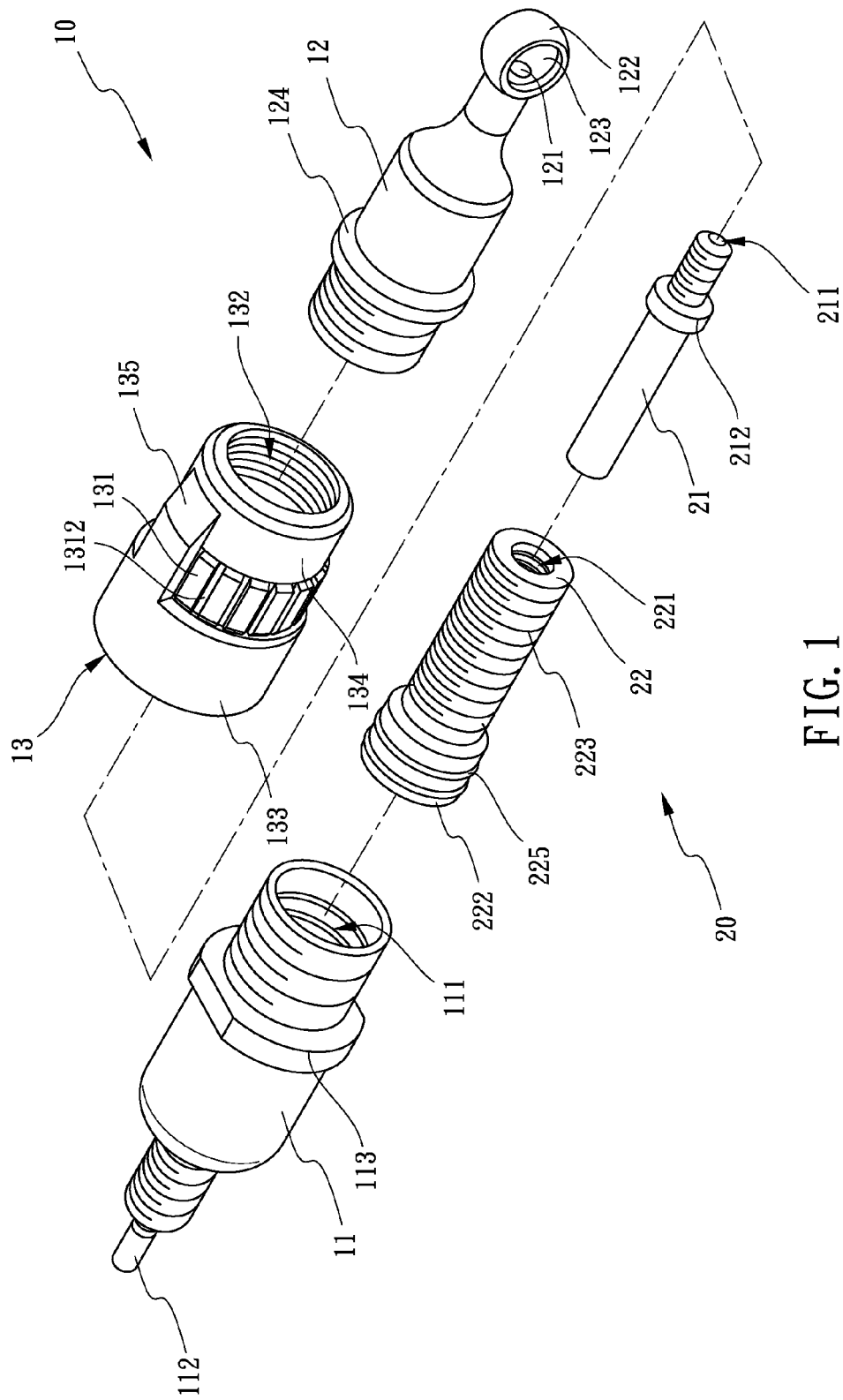
FIG. 1 is an exploded view of an adjustment device for a hydraulic brake system in accordance with the present invention.
Figure 2:
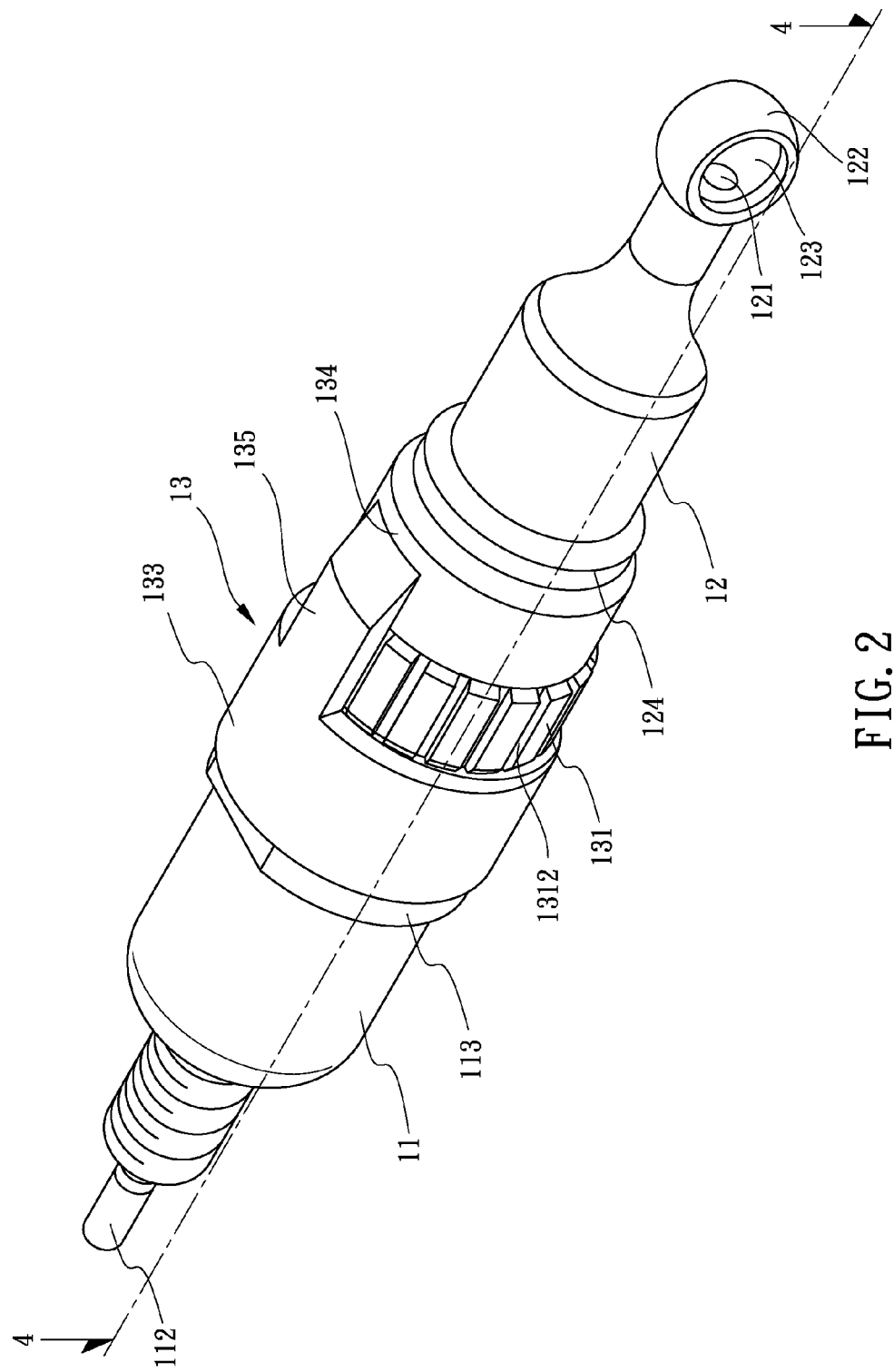
FIG. 2 is a perspective view of the adjustment device for a hydraulic brake system in accordance with the present invention.
Figure 3:
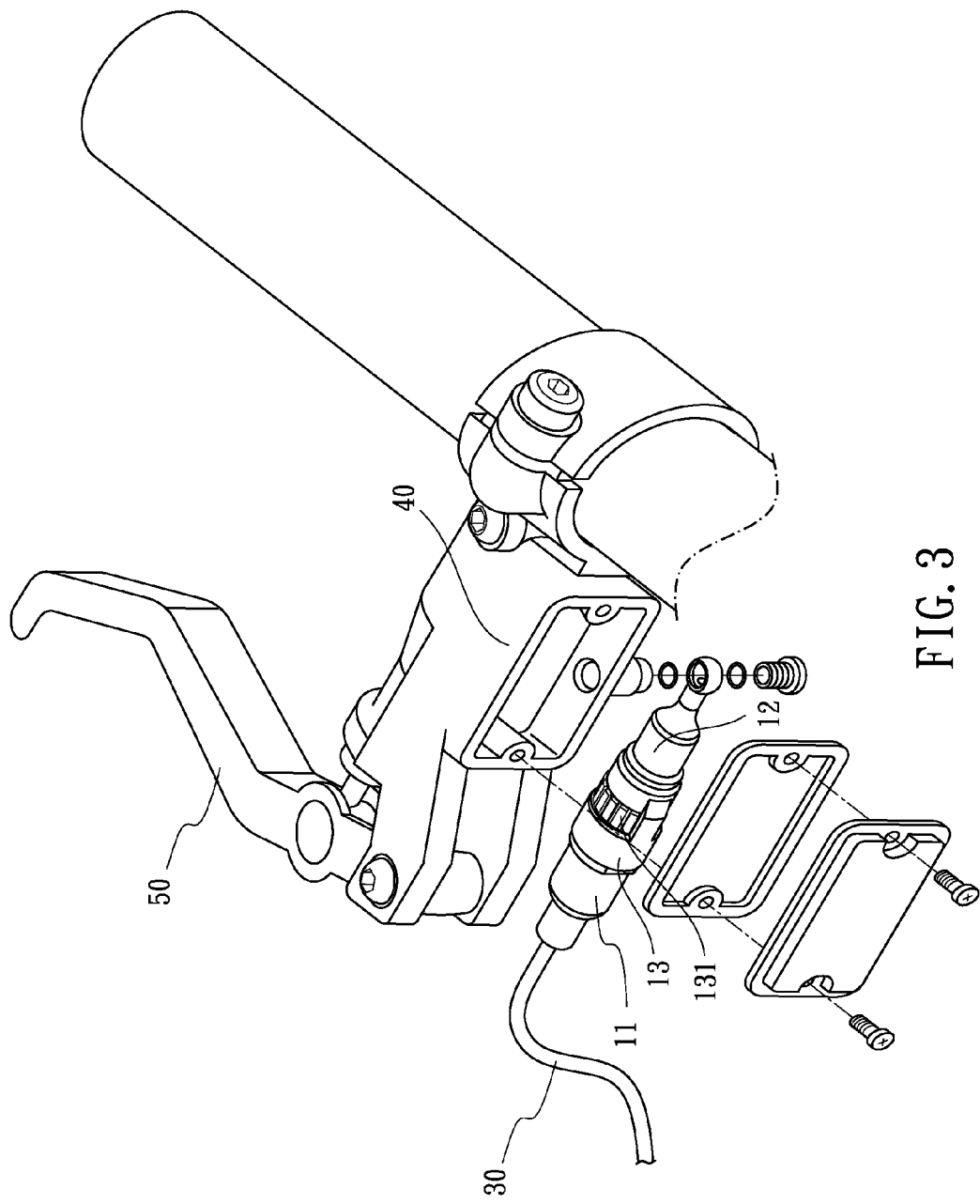
FIG. 3 is an exploded view for showing the adjustment device for a hydraulic brake system assembled between a hydraulic hose and a hydraulic cylinder.

Referring to FIGS. 1-5, an adjustment device for a hydraulic brake system comprises a hollow casing 10 and a retractable unit 20.

The hollow casing 10 has a first part 11, a second part 12 and a connection member 13. The connection member 13 is connected between the first part 11 and the second part 12. The connection member 13 has a rotatable ring 131 pivotally disposed at a central portion thereof. The first part 11 and the second part 12 have a first channel 111 and a second channel 121 opened therethrough respectively. The connection member 13 has a third channel 132 opened therethrough. Both the first channel 111 and the second channel 121 communicate with the third channel 132 of the connection member 13.

Figure 4:
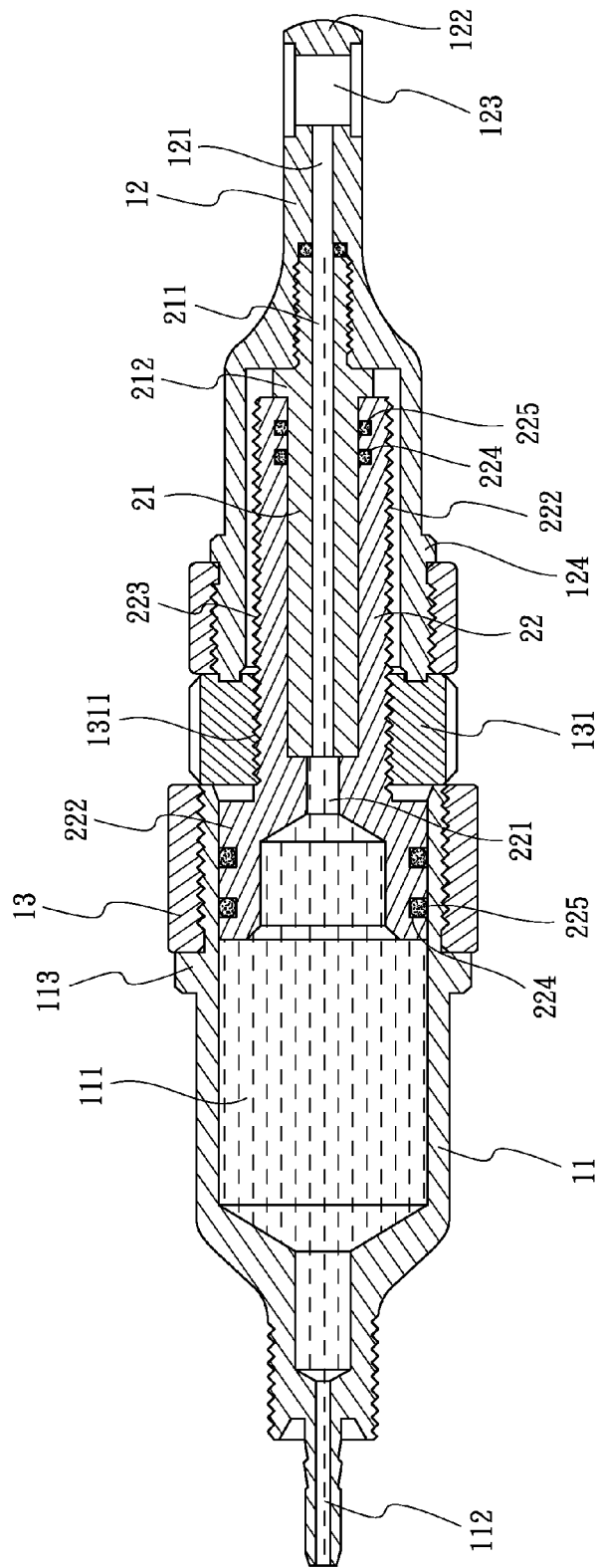
FIG. 4 is a cross-sectional view of the adjustment device for a hydraulic brake system along line 4-4 in FIG. 2 for showing a rotatable ring in the initial status.
Figure 5:
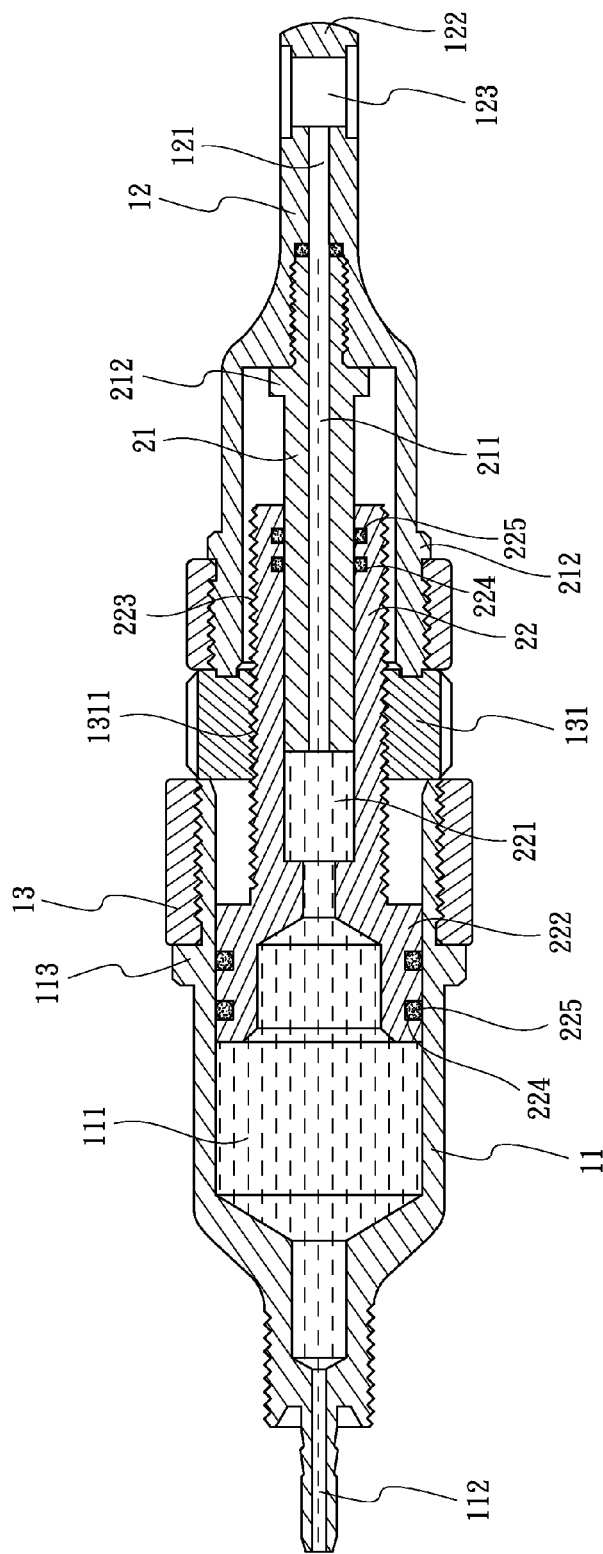
FIG. 5 is a cross-sectional view of the adjustment device for a hydraulic brake system along line 4-4 in FIG. 2 for showing the rotatable ring in the operating status.

The retractable unit 20 is assembled in the hollow casing 10. The retractable unit 20 has an inner tube 21 and an outer tube 22. The inner tube 21 and the outer tube 22 have a fourth channel 211 and a fifth channel 221 opened therethrough respectively. The fourth channel 211 and the fifth channel 221 communicate with the first channel 111 and the second channel 121. One end of the outer tube 22 is inserted into the first part 11, and another end of the outer tube 22 is threadedly assembled with the rotatable ring 131. One end of the inner tube 21 is inserted into the fifth channel 221, and another end of the inner tube 21 is fixed in the second part 12. Therefore, the outer tube 22 is movable relative to the inner tube 21 by rotating the rotatable ring 131. The adjustment device is assembled between a hydraulic hose 30 and a hydraulic cylinder 40. When a user rotates the rotatable ring 131, the outer tube 22 is slid in the first channel 111, so that an inner space of the first part 11 is adjustable (as shown in FIGS. 4-5) so as to adjust a sensitivity of a hydraulic brake system.

The first part 11 has a nozzle 112 defined at one end thereof which is opposite to the connection member 13. The second part 12 has a connection head 122 defined at one end thereof which is opposite to the connection member 13. The hydraulic hose 30 and the hydraulic cylinder 40 are connected to the nozzle 112 and the connection head 122 respectively. The connection head 122 has a through hole 123 opened therethrough. The through hole 123 communicates with the second channel 121, so that the hydraulic oil of the hydraulic cylinder 40 could flow into the second channel 121 via the through hole 123. The outer tube 22 has a piston head 222 defined at one end thereof, and another end of the outer tube 22 has an adjustment thread 222 defined at an outer periphery thereof. The piston head 222 is received in the first channel 11. The rotatable ring 131 has a driving thread 1311 defined in an inner periphery thereof and corresponding to the adjustment thread 222. The driving thread 1311 is threadedly connected with the adjustment thread 222, so that the outer tube 22 is moved relative to the inner tube 21 by rotating the rotatable ring 131.

Under this arrangement, when the user rotates the rotatable ring 131, the piston head 222 of the outer rod 22 is slid within the first channel 111 so as to adjust the inner space of the first part 11 and further adjust the sensitivity of the hydraulic brake system. Therefore, the user could press a brake lever 50 to brake a bicycle efficiently.

The first part 11 has a first abutting ring 113 protruded from an outer periphery thereof. One end of the connection member 13 is assembled to the first part 11 and abutted against the first abutting ring 113. The second part 12 has a second abutting ring 124 protruded from an outer periphery thereof. Another end of the connection member 13 is assembled to the second part 12 and abutted against the second abutting ring 124. The inner tube 21 has a third abutting ring 212 defined at an outer periphery thereof. One end of the third abutting ring 212 is abutted against an inner wall of the second part 12, and another end of the third abutting ring 212 is abutted against one end of the outer tube 22.

The connection member 13 has a first connection portion 133 and a second connection portion 134 defined at two end thereof respectively. The rotatable ring 131 is pivotally mounted between the first connection portion 133 and the second connection portion 134, so that the rotatable ring 131 is rotatable relative to the first connection portion 133 and the second connection portion 134. The connection member 13 has at least one extending portion 135 extended from one end of the first connection portion 133 to the second connection portion 134 and connected with an outer periphery of the second connection portion 134.

In addition, the rotatable ring 131 has a skidproof structure 1312 defined at an outer periphery thereof, so that the user can easily rotate the rotatable ring 131. The outer tube 22 has two pairs of grooves 224 respectively defined in an outer periphery of the piston head 222 and an inner periphery thereof which is corresponding to the inner tube 21. Each groove 224 has a rubber ring 225 positioned therein so as to prevent hydraulic oil leaking out from the outer tube 22.

Although the invention has been explained in relation to its preferred embodiment, it is to be understood that many other possible modifications and variations can be made without departing from the scope of the invention as hereinafter claimed.

What is claimed is:

1. An adjustment device for a hydraulic brake system comprising:
    a hollow casing having a first part, a second part and a connection member connected between the first part and the second part, the connection member having a rotatable ring pivotally disposed at a central portion thereof, the first part and the second part having a first channel and a second channel opened therethrough respectively, the connection member having a third channel opened therethrough, both the first channel and the second channel communicating with the third channel of the connection member; and
    a retractable unit assembled in the hollow casing, the retractable unit having an inner tube and an outer tube, the inner tube and the outer tube having a fourth channel and a fifth channel opened therethrough respectively, the fourth channel and the fifth channel communicating with the first channel and the second channel, one end of the outer tube inserted into the first part, another end of the outer tube threadedly assembled with the rotatable ring, one end of the inner tube inserted into the fifth channel, another end of the inner tube fixed in the second part, the outer tube being movable relative to the inner tube by rotating the rotatable ring;
    wherein, the adjustment device is assembled between a hydraulic hose and a hydraulic cylinder; when a user rotates the rotatable ring, the outer tube is slid in the first channel, so that an inner space of the first part is adjustable so as to adjust a sensitivity of a hydraulic brake system.

2. The adjustment device for a hydraulic brake system as claimed in claim 1, wherein the first part has a nozzle defined at one end thereof which is opposite to the connection member, the second part having a connection head defined at one end thereof which is opposite to the connection member, the hydraulic hose and the hydraulic cylinder connected to the nozzle and the connection head respectively.

3. The adjustment device for a hydraulic brake system as claimed in claim 1, wherein the outer tube has a piston head defined at one end thereof, another end of the outer tube having an adjustment thread defined at an outer periphery thereof, the piston head received in the first channel, the rotatable ring having a driving thread defined in an inner periphery thereof and corresponding to the adjustment thread, the driving thread threadedly connected with the adjustment thread, so that the outer tube is moved relative to the inner tube by rotating the rotatable ring.

4. The adjustment device for a hydraulic brake system as claimed in claim 1, wherein the first part has a first abutting ring protruded from an outer periphery thereof, the connection member assembled to the first part and abutted against the first abutting ring, the second part having a second abutting ring protruded from an outer periphery thereof, the connection member assembled to the second part and abutted against the second abutting ring, the inner tube having a third abutting ring defined at an outer periphery thereof, one end of the third abutting ring abutted against an inner wall of the second part, another end of the third abutting ring abutted against one end of the outer tube.

5. The adjustment device for a hydraulic brake system as claimed in claim 1, wherein the connection member has a first connection portion and a second connection portion, the rotatable ring pivotally mounted between the first connection portion and the second connection portion, so that the rotatable ring is rotatable relative to the first connection portion and the second connection portion.

6. The adjustment device for a hydraulic brake system as claimed in claim 5, wherein the connection member has at least one extending portion extended from one end of the first connection portion to the second connection portion and connected with an outer periphery of the second connection portion.

7. The adjustment device for a hydraulic brake system as claimed in claim 1, wherein the rotatable ring has a skidproof structure defined at an outer periphery thereof, so that the user can easily rotate the rotatable ring.

* * * * *